United States Patent [19]

(12) United States Patent
Mohamed-Rasheed et al.

(10) Patent No.: US 7,852,788 B2
(45) Date of Patent: Dec. 14, 2010

(54) METHOD OF ORGANIZING NODES OF A NETWORK INTO GROUPINGS OF NODES, COMPUTER PROGRAM FOR IMPLEMENTING SUCH A METHOD AND COMMUNICATION DEVICE FORMING A NODE OF A NETWORK OF NODES

(75) Inventors: Tinku Mohamed-Rasheed, Trento (IT); Yvon Gourhant, Lannion (FR); Laurent Reynaud, Trevou-Treguignec (FR)

(73) Assignee: France Telecom, Paris (FR)

( * ) Notice: Subject to any disclaimer, the term of this patent is extended or adjusted under 35 U.S.C. 154(b) by 99 days.

(21) Appl. No.: 12/281,617

(22) PCT Filed: Mar. 1, 2007

(86) PCT No.: PCT/FR2007/050862

§ 371 (c)(1),
(2), (4) Date: Sep. 3, 2008

(87) PCT Pub. No.: WO2007/099264

PCT Pub. Date: Sep. 7, 2007

(65) Prior Publication Data

US 2009/0190496 A1 Jul. 30, 2009

(30) Foreign Application Priority Data

Mar. 3, 2006 (FR) .................................. 06 01927

(51) Int. Cl.
*H04L 12/28* (2006.01)
(52) U.S. Cl. ........................ 370/254; 370/400; 370/406
(58) Field of Classification Search ........................ None
See application file for complete search history.

(56) References Cited

U.S. PATENT DOCUMENTS 6,363,416 B1 * 3/2002 Naeimi et al. ................ 709/209

(Continued)

FOREIGN PATENT DOCUMENTS

| WO | WO 03/039071 | 5/2003 |
| WO | WO 03/084160 | 10/2003 |

*Primary Examiner*—Jayanti K Patel
*Assistant Examiner*—Anthony Sol
(74) *Attorney, Agent, or Firm*—Cohen Pontani Lieberman & Pavane LLP

(57) ABSTRACT

A method of organizing nodes of a network into clusters of nodes comprises a step (130) of calculating, for each node, a weight, representing the aptness of this node to be the master node of a grouping, and a step (190) of electing a master node of a grouping, such that the weight of this master node is greater than or equal to the weights of the other nodes of the grouping. The method furthermore comprises a step (140 180) of storing, in each node, an information cue (14) containing an identifier of the node of highest weight known by this node and the value of this highest weight, a step (150) of transmitting, by each node to nodes adjacent to this node, the information cue (14) stored in this node, and a step (170) of comparing, for each node, the information cues (14) transmitted to this node during the transmitting step (150) with the information cue stored in this node, so as to determine a new node of highest weight known by this node. The steps of storing (180), transmitting (150) and comparing (170) are repeated successively a predetermined number (k) of times, on conclusion of which the step (190) of electing a master node is carried out, in the course of which a node (M) whose stored information cue contains its own identifier is chosen to be a master node.

8 Claims, 2 Drawing Sheets

U.S. PATENT DOCUMENTS

2002/0044549 A1* 4/2002 Johansson et al. .......... 370/386
2003/0204623 A1 10/2003 Cain
2004/0018839 A1* 1/2004 Andric et al. .............. 455/433
2005/0055418 A1* 3/2005 Blanc et al. ................. 709/209
2008/0268855 A1* 10/2008 Hanuni et al. .............. 455/445

* cited by examiner

METHOD OF ORGANIZING NODES OF A NETWORK INTO GROUPINGS OF NODES, COMPUTER PROGRAM FOR IMPLEMENTING SUCH A METHOD AND COMMUNICATION DEVICE FORMING A NODE OF A NETWORK OF NODES

RELATED APPLICATIONS

This is a U.S. national stage under 35 USC 371 of application No. PCT/FR2007/050862, filed on Mar. 1, 2007.

This application claims the priority of French patent application no. 06/01927 filed Mar. 3, 2006, the content of which is hereby incorporated by reference.

FIELD OF THE INVENTION

The present invention relates to a method of organizing nodes of a network into groupings of nodes, a computer program for implementing such a method, and a communication device forming a node of a network of nodes.

BACKGROUND OF THE INVENTION

In order to facilitate the routing of data in a network, in particular when this network comprises a large number of nodes, it is known to organize the nodes of this network into groupings (also called "clusters").

A node of each cluster, termed the master node, is chosen to ensure the organization and maintenance of the cluster of nodes of which it forms part, in particular by serving as gateway between this grouping and the other nodes of the network. For this purpose, the master nodes of the clusters communicate with one another for routing data from one node of one cluster to another node of another cluster, by serving as intermediary between these nodes.

It will be noted that the organization of the nodes of a network into clusters is particularly necessary in the case of an ad hoc network, that is to say a network not comprising any predetermined infrastructure, in which furthermore there is only a limited bandwidth and in which the nodes are potentially mobile.

The nodes of an ad hoc network being potentially mobile, it is sometimes necessary to reorganize the clusters of nodes. Thus, it is preferable to have available a fast and effective method of organizing the nodes of the network into clusters of nodes.

A fast and effective method such as this is particularly necessary in a large-scale ad hoc network, that is to say an ad hoc network comprising a large number of nodes, for example more than a hundred nodes, and whose nodes are particularly mobile.

A method of organizing nodes of a network by grouping nodes is already known from the prior art, in which at least one node, termed the master node, is chosen to serve as gateway between a grouping of nodes and other nodes of the network, the method comprising:

a step of calculating, for each node, a numerical value, termed the weight, representing the aptness of this node to be the master node of a cluster of nodes, a step of electing, from among the nodes, a master node of a cluster, such that the weight of this master node is greater than or equal to the weights of each other node of the cluster comprising this master node.

In general, the weight of a node is calculated by taking account of parameters corresponding to properties inherent to this node, such as, for example, its mobility, its transmission power, the extent of its coverage zone, the power of its battery, its connectivity, etc.

The weight of a node can also be calculated by taking account of parameters corresponding to structural properties of the network, such as, for example, the number of nodes adjacent to the node whose weight is calculated.

In accordance with this conventional method for organizing nodes, each node of the network transmits an information cue containing its weight towards the nodes adjacent to it, generally by flood routing. The node chosen to be the master node is then the node whose weight is higher than the weights of all the nodes adjacent to it.

It will be noted that such a method is generally expensive in resources, and that it generally makes it possible to form only clusters of nodes of small sizes. Specifically, although it is possible to organize the nodes into clusters of larger sizes, each node must, in this case, transmit the information cue relating to its weight to a large number of nodes, thereby considerably increasing the costs in terms of resources and system time.

SUMMARY OF THE INVENTION

One object of the present invention is to provide a method of organizing nodes of a network into clusters of nodes which is relatively simple, fast and effective, while being inexpensive in resources.

One aspect of the present invention is directed to a method of organizing nodes of a network into clusters of nodes, in which at least one node, termed the master node, is chosen to serve as gateway between a cluster of nodes and other nodes of the network, the method comprising:

a step of calculating, for each node, a numerical value, termed the weight, representing the aptness of this node to be the master node of a cluster of nodes, a step of electing, from among the nodes, a master node of a cluster, such that the weight of this master node is greater than or equal to the weights of each other node of the cluster comprising this master node, characterized in that the method furthermore comprises, between the step of calculating and the step of electing a master node:

a step of storing, in each node, an information cue containing an identifier of the node of highest weight known by this node and the value of this highest weight, the node of highest weight known being the node itself if the latter has not received any other information cue, a step of transmitting, by each node to nodes adjacent to this node, the information cue stored in this node, a step of comparing, for each node, the information cues transmitted to this node during the transmitting step with the information cue stored in this node, so as to determine a new node of highest weight known by this node, the steps of storing, transmitting and comparing being carried out successively a predetermined number of times, on conclusion of which the step of electing a master node is carried out, in the course of which a node whose stored information cue contains its own identifier is chosen to be a master node.

In accordance with this method, the transmission of the information cues relating to the weights of the nodes is done only gradually, this being less expensive in resources than broadcasting to all the other nodes of a cluster, in particular when this cluster is of large size.

Additionally, it is not necessary for each node of a cluster to know the weights of all the other nodes of the cluster in order to choose the master node. Specifically, by virtue of the method according to the invention, only the information cues relating to the nodes of known highest weight are transmitted to the nodes.

Finally, it will be noted that this method makes it possible to organize clusters of nodes of sizes that are as large as necessary, without however increasing the complexity of this method. Specifically, to increase the size of the clusters, it suffices to increase the predetermined number of realizations of the storing, transmitting and comparing steps. Thus, the information cue relating to the node of highest weight is broadcast to a larger number of nodes, extending when the predetermined number of realizations increases.

It is therefore clearly apparent that the invention makes it possible to organize the nodes of a network into clusters in a simple, fast and effective manner, thus allowing a better routing of the information cues in this network.

An organizing method according to the invention can furthermore comprise one or more of the following characteristics:

- the method comprises, after the step of electing the master node, a step of forming a cluster of nodes, in the course of which each node whose stored information cue contains the identifier of the chosen master node is included in the cluster of nodes comprising this master node;
- the method comprises a first preliminary step in the course of which each node of the network is provided with an information cue relating to the predetermined number of repetition of the steps of storing, transmitting and comparing;
- the method comprises a second preliminary step in the course of which each node of the network is provided with a list of all the nodes adjacent to this node;
- the method comprises a third preliminary step in the course of which each node of the network is provided with parameters for calculating its weight;
- the method comprises a step, following the transmitting step, of verifying, for each node, that each node adjacent to this node has transmitted an information cue in the course of the transmitting step, a node not having transmitted the information cue being deleted from the list of adjacent nodes;
- in the course of the comparing step if two information cues contain an identical weight, that node whose weight is the highest is determined with the aid of an arbitrary decision, for example by comparison of the value of the identifiers contained by the information cues, the node whose identifier is the largest being considered to be the node of highest weight.

Another aspect of the invention is directed to a computer program for implementing a method of organizing nodes as defined previously, intended to be installed on a node of a network of nodes, characterized in that it comprises software instructions for:

- calculating a numerical value, termed the weight, representing the aptness of the node to be the master node of a cluster of nodes,
- storing, in the node, an information cue containing an identifier of the node of highest weight known by this node and the value of this highest weight, the node of highest weight known being the node itself if the latter has not received any other information cue
- transmitting the information cue stored in the node to nodes adjacent to this node,
- comparing information cues transmitted to this node with the information cue stored in this node, so as to determine a new node of highest weight known by this node,
- repeating the instructions for storing, transmitting and comparing a predetermined number of times, and
- verifying whether the stored information cue contains the node's own identifier.

Another aspect of the invention is directed to a communication device forming a node of a network of nodes, comprising means for calculating a numerical value, termed the weight, representing the aptness of this node to serve as gateway between the cluster of nodes and other nodes of the network, characterized in that the device comprises:

- means for storing an information cue (14) containing an identifier of the node of highest weight known by the device and the value of this highest weight, the node of highest weight known being the device itself if the latter has not received any other information cue,
- means for transmitting the information cue (14) stored in the device to nodes adjacent to this device,
- means for comparing information cues (14) transmitted to the device with the information cue stored in this device, so as to determine a new node of highest weight known by the device,
- verifying means intended to verify whether the stored information cue contains the device's own identifier, said verifying means being able to be activated after the storing, transmitting and comparing means have been successively activated a predetermined number (k) of times, and in that the device comprises means for determining that this device is a master node (M), said determining means being able to be activated if the verifying means confirm that the stored information cue contains the device's own identifier.

Such a device can in particular host a computer program as defined previously, which drives its storing, transmitting, comparing, verifying and determining means.

BRIEF DESCRIPTION OF THE DRAWINGS

The invention will be better understood on reading the description which follows, given solely by way of example and while referring to the appended drawings in which.

DETAILED DESCRIPTION OF THE DRAWINGS

Figure 2:
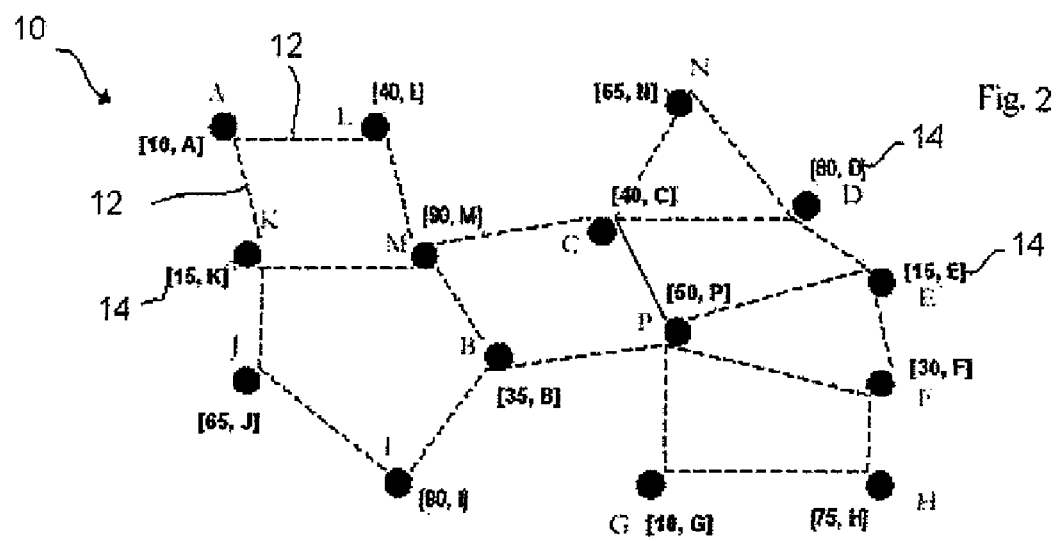
FIGS. 2 to 4 represent a network of nodes in which the organizing method of FIG. 1 is implemented in the course of various steps of this method.

Represented in FIG. 2 is a network of nodes, for example an ad hoc network, designated by the general reference 10. In this network, each node is a wireless communication device.

The network 10 comprises potentially mobile nodes, designated by the references A, B, C, . . . , P, and linked together by links 12. The links 12 are generally cables in the case of a conventional wired network, or are virtual links in the case of a wireless network such as an ad hoc network. In the case of a wireless network, a link 12 between two nodes signifies that each of these nodes is situated in the zone of coverage of the other, and that each of these nodes is therefore liable to exchange data with the other node.

Each node of the network 10 comprises means for storing an information cue 14, this information cue 14 containing an identifier of the node of highest weight known by the node in which the information cue 14 is stored, as well as the value of this highest known weight.

It is recalled that the weight of a node represents its aptness to be the master node of a cluster of nodes.

Figure 3:
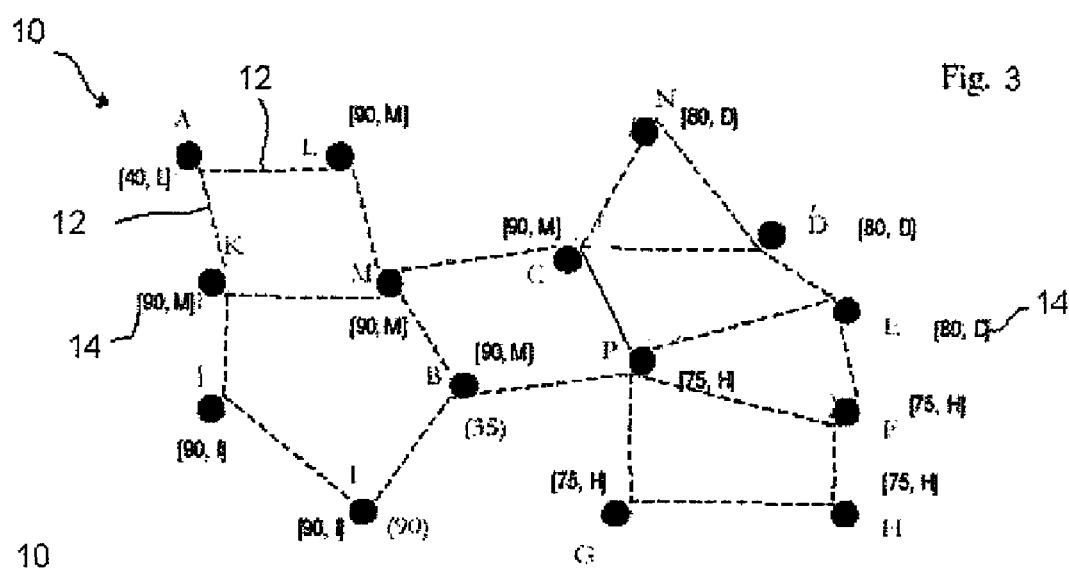
Figure 4:
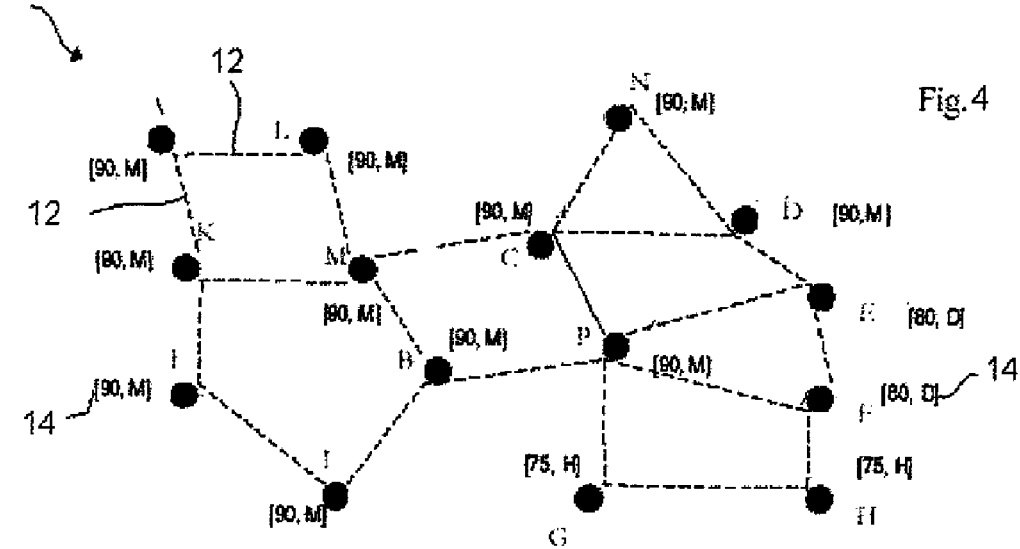

In FIGS. 2 to 4, each information cue 14 stored in a node is represented by a number and a letter between square brackets, the letter representing the identifier of the node of highest weight known and the number representing this highest weight known.

Figure 1:
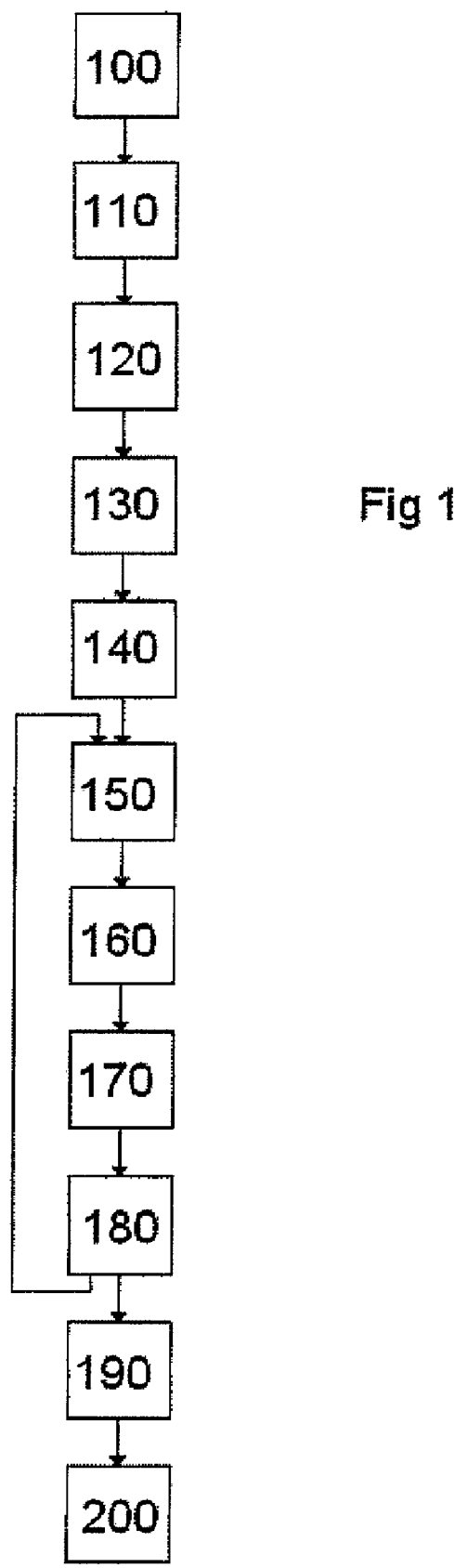
FIG. 1 represents the steps of an organizing method according to an exemplary embodiment of the invention.

Represented in FIG. 1 is the method for organizing the nodes of the network 10 according to an exemplary embodiment of the invention.

In the course of a first preliminary step 100, each node of the network 10 is provided with an information cue relating to a predetermined number k representing the size of the groupings of nodes that one desires to organize.

It will be recalled that the minimum number of links 12 through which it is necessary to pass in order to transmit a message between the master node and a peripheral node of a cluster of nodes is called the size k of this cluster of nodes.

The size k of the groupings of nodes generally depends on the number of nodes of the network, the groupings of nodes preferably being all the larger the larger the number of nodes in the network.

In the course of a second preliminary step 110, each node of the network is provided with a list of all the nodes adjacent to this node, that is to say all the nodes which are connected to it by a single link 12.

In order to construct these lists, each node can for example be equipped with means for identifying the nodes adjacent to it, in particular means for sending and receiving a recognition signal that is provided for this purpose.

During a third preliminary step 120, each node of the network is provided with parameters for calculating its weight.

In general, these parameters correspond to properties inherent to each node, such as, for example, its mobility, its transmission power, the extent of its coverage zone, the power of its battery, its connectivity, etc. Parameters corresponding to structural properties of the network, such as, for example, the number of nodes adjacent to the node whose weight is calculated, can also be taken into account in calculating the weight.

It will be noted that this step 120 is optional, in particular in the case where the parameters for the weight calculations are already stored in the nodes.

In the course of a step 130, for each node, the weight of this node is calculated with the aid of the parameters defined in the course of step 120.

In the course of a step 140, the information cue 14 containing the identifier of the node of highest weight known by each node and the value of this highest weight is stored in each node.

At this juncture of the method, the node of highest weight known by this node is the node itself, since the latter has not yet received any other information cue. In FIG. 2, the stored information cues 14 associated with each of the nodes represented each comprise the identifier of the node in which it is stored and the weight of this node.

It will be noted that the values of the weights represented in FIG. 2 are purely symbolic and given by way of example for a better understanding of the organizing method according to the invention.

In the course of a step 150, each node transmits the information cue 14 that it has stored to the nodes adjacent to it. The transmission of this information cue 14 is carried out in a manner known per se, for example by flood routing.

Preferably, the transmitting step 150 is followed by a step 160, in the course of which each node verifies whether it has actually received the information cues 14 of each of the nodes adjacent to it. For this purpose, each node compares the forwarders of the information cues 14 that it has received with the list of nodes adjacent to it which it was provided with in the course of the second preliminary step 110.

In the case where a node has not received the information cues 14 from all the nodes adjacent to it, this node can dispatch a request to the adjacent node from which it has not received the information cue 14. This adjacent node must then transmit the information cue 14 back in return.

This request is intended to verify whether this adjacent node is no longer available, or whether the information cue has not been received because of a transmission error.

Following this request, if the node has still not received the information cue 14 from the adjacent node, it is considered that this adjacent node is no longer available. Such is for example the case if this adjacent node has moved outside of the zone of coverage of the node or else if it is out of service. In this case, this adjacent node is deleted from the list of the node's adjacent nodes.

In the course of a step 170, each node compares all the information cues 14 which have been transmitted to it during the transmitting step 150, as well as with the information cue 14 stored in this node.

The aim of this comparison is to determine which is the node of highest weight known by the node. For this purpose, the weights contained by the information cues 14 received are compared and that one of these weights which is the highest is retained.

In some cases, for example in the case of the node B, two adjacent nodes I and M have an identical weight.

In this case, in order to determine which of these two nodes is the node of highest weight, an arbitrary decision is used. For example, the identifiers of these nodes are compared, the node whose identifier being the largest being considered to be the node of highest weight.

In the example represented, the identifier of node M is greater than the identifier of node I. Node B therefore considers that the node of highest weight known is node M.

In the course of a step 180, a new information cue 14 corresponding to the new node of highest weight known is stored in the node, this information cue 14 being intended to overwrite that which was previously stored. Specifically, the previous information cue 14 becomes obsolete from the moment the node has received new information cues.

Represented in FIG. 3 are the nodes of the network 10 after this storing step 180. In this figure, the information cues stored in each node correspond to the node of highest weight currently known by this node.

For example, the information cues 14 stored in nodes B, C, J, K and L comprise the identifier and the weight of node M, the latter having a higher weight than theirs and than that of the other nodes adjacent to them.

On conclusion of step 180, a plurality of nodes of the network having stored one and the same information cue relating to a node of the highest known weight is obtained, as is represented in FIG. 3. Thus, it is possible to choose a master node for the grouping of the nodes containing this same information cue, but it is also possible to further increase the size of this cluster.

For this purpose, the transmitting 150, comparing 170, and storing 180 steps can be repeated a predetermined number of times, corresponding to the number k representing the size of the cluster determined during step 100.

Thus, preferably, an incrementation of a tracking variable is performed after the storing step 180, and the transmitting 150, comparing 170, and storing 180 steps are carried out again so long as this tracking variable is less than k.

Once the transmitting 150, comparing 170, and storing 180 steps have been carried out a number k of times, at least one cluster of nodes of size equal to this number k is obtained, in which all the nodes of the network have stored one and the same information cue 14 relating to the node of the highest weight of this cluster, as is represented in FIG. 4.

In the example represented in FIG. 4, the node of the highest weight of the cluster is node M.

A step 190 is then carried out, in the course of which each node verifies what identifier is contained in the information cue 14 that it has stored.

If this identifier is that of this node itself, the latter is chosen to be the master node of the cluster, since its weight is greater than or equal to the weight of each other node of this cluster.

A step 200 of forming a cluster of nodes is then carried out, in the course of which each node whose stored information cue contains the identifier of the master node M chosen is included in the cluster of nodes comprising this master node M.

Preferably, in the course of this step, node M dispatches to all the nodes of its cluster a message intended to confirm that it is actually the master node of this cluster.

A cluster of nodes has thus been carried out in a simple and effective manner, while having determined which is its master node, this node grouping being of as large a size k as necessary (in the example represented, the size k is equal to 2).

It will be noted that the nodes of the network whose stored information cue 14 does not contain the identifier of node M do not form part of its cluster. In the example represented in FIG. 4, this is the case for nodes E, F, G and H.

In this example, the information cues 14 stored in nodes E and F contain the identifier of node D as identifier of the node of highest weight known.

However, this node D is not a master node since it forms part of the cluster whose master node is node M.

Thus, node D has not dispatched any confirmation message according to which it is actually a master node, and nodes E and F thus remain independent nodes not forming part of any cluster.

Additionally, the information cue 14 stored in node H contains its own identifier. It is therefore considered to be the master node of a cluster of nodes in which the stored information cue 14 contains its identifier, that is to say node G, and possibly of other nodes not represented.

It is clearly apparent that the method according to the invention makes it possible to generate a plurality of groupings of nodes in the network 10 in a simple, fast and effective manner.

It will be noted that in order to carry out the method for organizing the nodes, each node is preferably furnished with a computer program for implementing the method of organizing nodes which has just been described. Such a computer program comprises in particular software instructions for:
- calculating the weight of the node,
- storing, in the node, the information cue 14,
- transmitting to nodes adjacent to the node, the information cue 14 stored in this node,
- comparing information cues 14 transmitted to this node with the information cue 14 stored in this node, so as to determine a new node of highest weight known by this node,
- repeating a predetermined number of times the instructions for storing, transmitting and comparing, and
- verifying whether the stored information cue contains the node's own identifier.

Each communication device forming a node of the network also comprises, in order to implement the method:
- means for calculating the weight,
- means for storing the information cue (14),
- means for transmitting the information cue (14) stored in the device to nodes adjacent to this device,
- means for comparing information cues (14) transmitted to the device with the information cue stored in this device, so as to determine a new node of highest weight known by the device, and
- verifying means intended to verify whether the stored information cue contains the device's own identifier.

The verifying means are able to be activated after the storing, transmitting and comparing means have been successively activated a predetermined number (k) of times.

The device furthermore comprises means for determining that this device is a master node (M), said determining means being able to be activated if the verifying means confirm that the stored information cue contains the device's own identifier.

It will be noted that the invention is not limited to the embodiment described above. Specifically, the method described above is susceptible to diverse variants without however departing from the scope of the invention.

The invention claimed is:

1. A method of organizing nodes (A, B, C, . . . , L) of a network (10) into groupings of nodes, in which at least one master node (M) is chosen to serve as gateway between a grouping of nodes and other nodes of the network, the method comprising:
    a step (130) of calculating, for each node, a weight, representing the aptness of the node to be the master node of a grouping of nodes,
    a step (190) of electing, from among the nodes, a master node of a grouping, such that the weight of the master node is greater than or equal to the weights of each other node of the grouping comprising the master node,
    wherein the method furthermore comprises, between the steps (130) of calculating and (190) of electing a master node:
    a step (140 180) of storing, in each node, an information cue (14) containing an identifier of the node of highest weight known by the node and the value of the highest weight, the node of highest weight known being the node itself if the latter has not received any other information cue,
    a step (150) of transmitting, by each node to adjacent nodes, the information cue (14) stored in the node,
    a step (170) of comparing, for each node, the information cues (14) transmitted to the node during the transmitting step (150) with the information cue stored in the node, so as to determine a new node of highest weight known by the node,
    the steps of storing (180), transmitting (150) and comparing (170) being carried out successively a predetermined number (k) of times, on conclusion of which the step (190) of electing a master node is carried out, in the course of which a node (M) whose stored information cue contains its own identifier is chosen to be a master node,
    wherein the method further comprises a preliminary step (100) in the course of which each node of the network is provided with an information cue relating to the predetermined number (k) of repetitions of the steps of storing (180), transmitting (150) and comparing (170).

2. The method of organizing nodes as claimed in claim 1, comprising, after the step (190) of electing the master node (M), a step (200) of forming a grouping of nodes, in the course of which each node whose stored information cue contains the identifier of the chosen master node is included in the grouping of nodes comprising the this master node (M).

3. The method of organizing nodes as claimed in claim 1, comprising a second preliminary step (110) in the course of which each node of the network is provided with a list of all adjacent nodes.

4. The method of organizing nodes as claimed in claim 3, comprising a step (160), following on from the transmitting step (150), of verifying, for each node, that each adjacent node has transmitted an information cue (14) in the course of the transmitting step (150), a node not having transmitted the information cue being deleted from the list of adjacent nodes.

5. The method of organizing nodes as claimed in claim 1, comprising a third preliminary step (120) in the course of which each node of the network is provided with parameters for calculating its weight.

6. The method of organizing nodes as claimed in claim 1, in which, in the course of the comparing step (170), if two information cues contain an identical weight, that node whose weight is the highest is determined by comparison of the value of the identifiers contained by the information cues, the node whose identifier is the largest being considered to be the node of highest weight.

7. A non-transitory computer-readable medium storing a computer program for implementing a method of organizing nodes, adapted to be installed on a node of a network of nodes, wherein the computer program comprises software instructions for:

calculating a weight, representing the aptness of the node to be the master node of a grouping of nodes, storing, in the node, an information cue containing an identifier of the node of highest weight known by the node and the value of the highest weight, the node of highest weight known being the node itself if the latter has not received any other information cue transmitting the information cue stored in the node to adjacent nodes, comparing information cues transmitted to the node with the information cue stored in the node, so as to determine a new node of highest weight known by the node, repeating the instructions for storing, transmitting and comparing a predetermined number of times, and verifying whether the stored information cue contains the node's own identifier, wherein the computer program further comprises software instructions for receiving an information cue relating to the predetermined number of repetitions of the steps of storing, transmitting and comparing.

8. A communication device forming a node of a network of nodes, the device comprising:

means for calculating a weight, representing the aptness of the node to serve as gateway between the grouping of nodes and other nodes of the network, means for storing an information cue (14) containing an identifier of the node of highest weight known by the device and the value of the highest weight, the node of highest weight known being the device itself if the latter has not received any other information cue, means for transmitting the information cue (14) stored in the device to adjacent nodes, means for comparing information cues (14) transmitted to the device with the information cue stored in the device, so as to determine a new node of highest weight known by the device, verifying means intended to verify whether the stored information cue contains the device's own identifier, said verifying means being able to be activated after the storing, transmitting and comparing means have been successively activated a predetermined number (k) of times, and means for determining that the device is a master node (M), said determining means being able to be activated if the verifying means confirm that the stored information cue contains the device's own identifier, wherein the device further comprises means for receiving an information cue relating to the predetermined number of repetitions of the steps of storing, transmitting and comparing.

* * * * *